Aug. 23, 1966 K. G. GERBER 3,268,640
PRODUCTION OF FILM FROM ORGANIC THERMOPLASTIC MATERIAL
Filed April 15, 1963 3 Sheets-Sheet 1
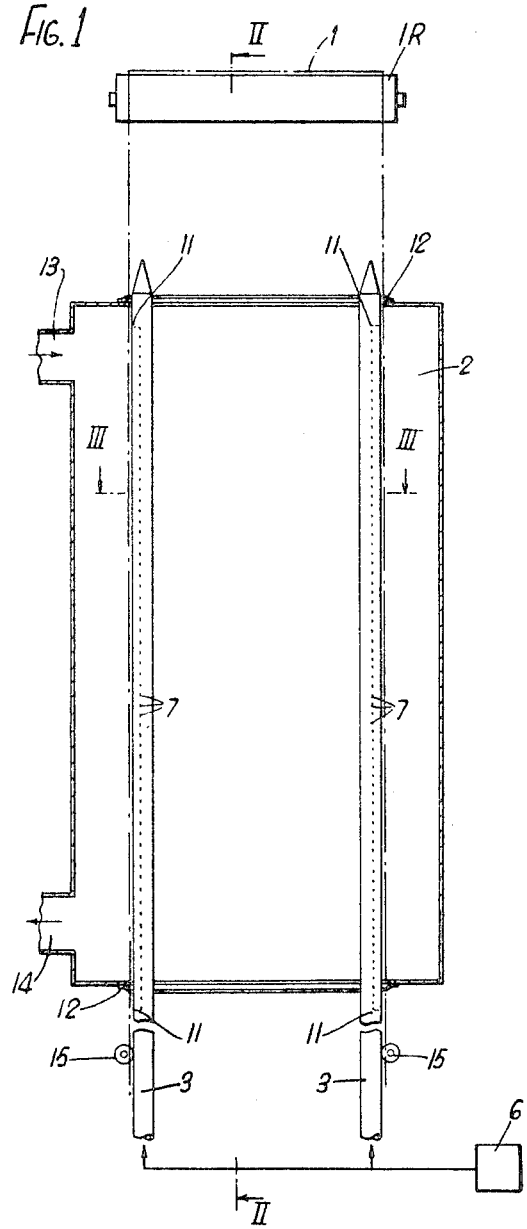
Inventor
KENNETH G. GERBER
By Imirie & Smiley
Attorneys

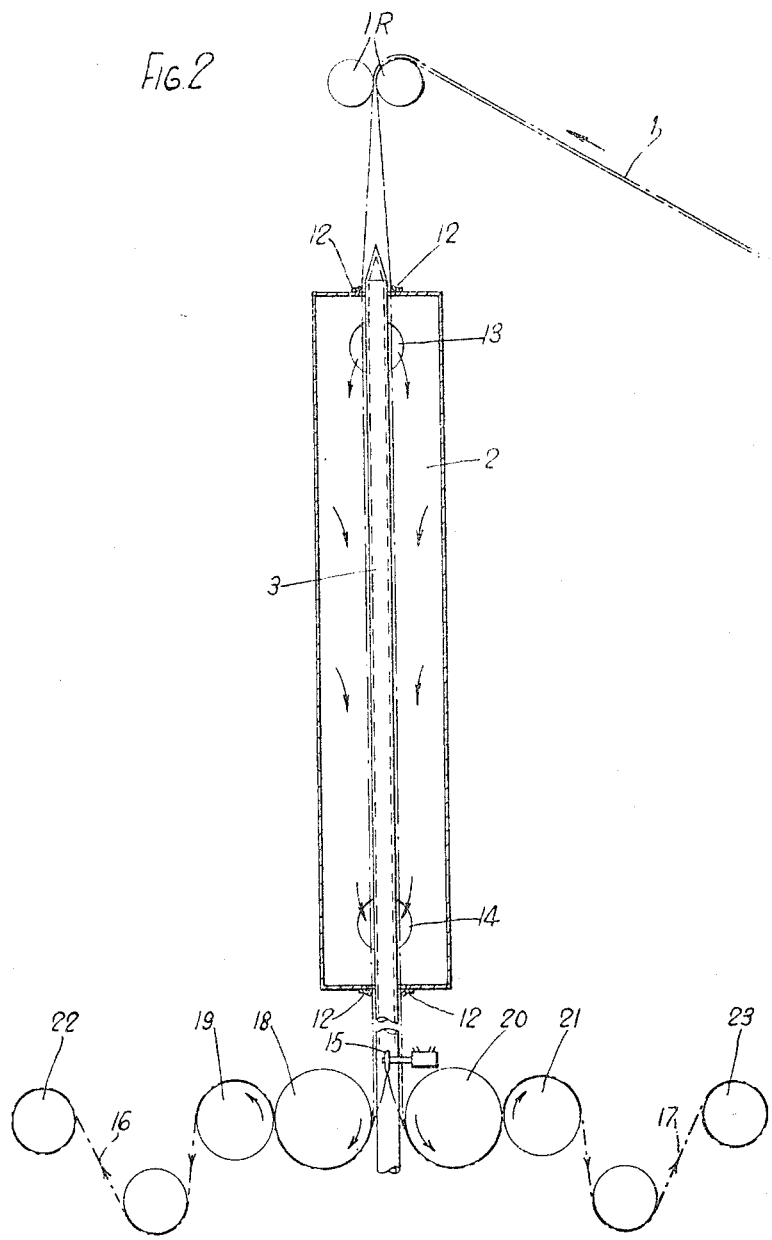

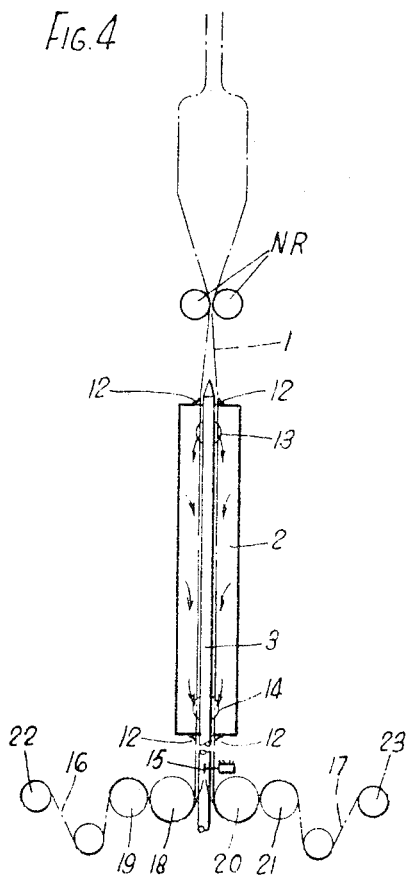
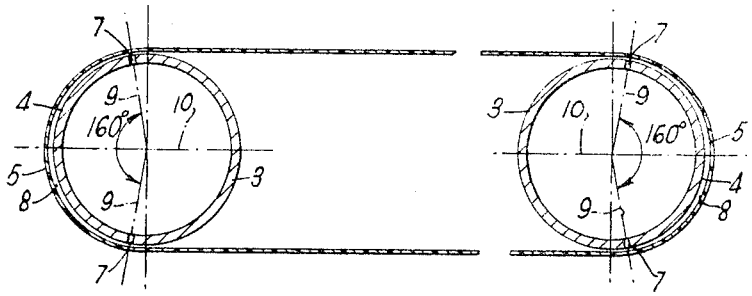

United States Patent Office
3,268,640
Patented August 23, 1966

3,268,640
PRODUCTION OF FILM FROM ORGANIC
THERMOPLASTIC MATERIAL
Kenneth George Gerber, Southsea, England, assignor to
The Metal Box Company Limited, London, England, a
British company
Filed Apr. 15, 1963, Ser. No. 272,976
Claims priority, application Great Britain, May 18, 1962,
19,327/62
16 Claims. (Cl. 264—95)

This invention relates to the production of biaxially oriented film from organic thermoplastic material such as polypropylene, polyethylene, polystyrene, or polyvinyl chloride.

On method of producing such film consists of simultaneously lengthwise and laterally stretching a softened extruded tube of the organic thermoplastic material and flattening the oriented tube by passing it between nip rollers which also operate to effect the longitudinal stretching of the material. Due to the manner in which the tubular oriented material is flattened, and to the tendency of extruded film to have thickness variations, the oriented film is seldom flat and usually has what is known as a sag or bagginess in the centre region of the flattened tube.

To remove the sag from a continuously travelling tube of oriented film it has been proposed to make use of the well known property of the material to shrink when subjected to an appropriately heated atmosphere and of the well known property of shrinkable materials to become taut and smooth if subjected to restraint acting against the direction of shrinkage during the shrinking.

It is a main object of the present invention to provide an improved method of and apparatus for removing sag, bagginess and wrinkles from biaxially oriented organic thermoplastic film made by a tubular process in a manner such that the whole area of the film is substantially free from sag, bagginess and wrinkles.

According to the invention there is provided the method of removing sag, bagginess, and wrinkles from tubular biaxially oriented organic thermoplastic film, by subjecting the tubular film to a heat treatment while passing the tubular film lengthwise about hollow members disposed in spaced side-by-side relation to extend lengthwise of the tube, and maintaining a cushion of warm air between the tubular film and those portions of the hollow members opposed thereto to retain the tubular film in spaced relation with said members.

The heat treatment may be effected in an oven through which heated air is passed. The temperature of said warm air cushion may be substantially equal to that of the temperature to which the tubular film is subjected by said heat treatment.

Further according to the invention there is provided apparatus for removing sag, bagginess, and wrinkles from tubular biaxially oriented organic thermoplastic film, comprising hollow members connectable with a source of warm pressurised air and disposed in spaced side-by-side relation, means to move a biaxially oriented tubular film lengthwise about said hollow members, apertures formed in said members to permit warm air to issue from said members and form an air cushion between the members and those portions of the tubular film opposed thereto thereby to retain the tube in spaced relation with said members, and means to subject the tube to heat treatment while it is so spaced from said members.

Said hollow members may comprise a pair of pipes each having an arcuate surface to face a portion of the tubular film, each pipe having the apertures formed in said arcuate surface thereof and disposed in two rows extending lengthwise of the pipe with the axes of the apertures of the respective rows located in planes forming an angle slightly less than 180 degrees with the centre of curvature of said arcuate surface and equispaced about a line bisecting the arcuate surface. The angle may be of the order of 160 degrees.

The hollow members may extend lengthwise through an oven open at the opposite ends thereof and provided with an inlet and an outlet by which heated air is passed through the oven to effect the heat treatment of the tubular film.

In order that the invention may be clearly understood an embodiment thereof will now be described, by way of example, with reference to the drawings accompanying the provisional specification, in which:

FIGURE 1 is a diagrammatic section through apparatus according to the invention,
FIGURE 2 is a view on line II—II, FIGURE 1,
FIGURE 3 is a section on line III—III, FIGURE 1, and
FIGURE 4 is a view similar to FIGURE 2 but showing a modification thereto.

The manner in which the tube or organic thermoplastic material is extruded and biaxially oriented is diagrammatically illustrated in FIGURE 4 but forms no part of the present invention and is not described herein, it being understood that this can be effected by any of the processes currently employed for this purpose.

Following orientation of the tubular material the oriented tubular film is flattened by the draw nip rollers NR, FIGURE 4, and the flattened tube 1, FIGURE 2, is fed lengthwise to a heating chamber, shown as an oven 2, in which the material is subjected to a heat treatment to remove sag, bagginess, and wrinkles therefrom.

The chamber 2 is open at the opposite ends thereof to permit the material to be drawn through the chamber and hollow members are located in the chamber and extend therethrough lengthwise thereof in side-by-side spaced relation. The tube is passed lengthwise about the hollow members and assumes a generally oblong rectangular cross-section as illustrated in FIGURE 3. As illustrated in the drawings the hollow members comprise a pair of pipes 3 each having an arcuate surface 4, FIGURE 3, to face an end 5 of the reformed tube. The pipes 3, which may have an external diameter of about 2 inches, are connectable with a source of warm pressurised air and are each provided lengthwise thereof with apertures 7, FIGURE 3, permitting the maintenance of a warm air cushion 8 between the exterior of the hollow members and the portions 5 of the tube opposed thereto thereby to retain the tube in spaced relation with the hollow members. The temperature of the warm pressurised air is preferably substantially equal to the temperature to which the film is subjected by the heat treatment referred to below.

Each pipe 3 has the apertures 7 formed in the arcuate surface 4 and disposed in two rows extending lengthwise of the pipe with the axes of the apertures of the respective rows located in planes 9, FIGURE 3, forming an angle slightly less than 180 degrees facing the arcuate surface 4 and equispaced about a line 10 bisecting the surface 4. In a preferred embodiment of the invention the angle is of the order of 160 degrees.

The upper ends of the pipes 3 are closed so that the air from source 6 passes through the apertures 7, which may be about 0.045 inch in diameter and spaced apart lengthwise of the pipes at intervals of about 0.25 inch, and forms the warm air cushions 8, the pressure of the air being so selected as to ensure that the tube does not engage the pipes during heat treatment of the material in the chamber 2. The air pressure may be of the order of about one-half pound per square inch and perforations 11, FIGURE 1, extending in rows round the pipe 3 define the limits of the air bearing or cushion.

As illustrated in the drawings the pipes 3 are of circular cross-section but it will be understood that the cross-section may, if desired, be varied, for example the pipes may be of "D" cross-section.

The openings at the opposite ends of the chamber 2 are provided with flexible sealing members 12, FIGURE 2, of any suitable kind, to make sealing engagement with material entering and leaving the chamber.

Heat treatment of the material in the chamber may be effected in any desired manner but with apparatus illsutrated in the drawings is effected by heated air which enters the chamber 2 at an inlet position 13 and after passing through the chamber leaves from outlet position 14. It will be understood that the temperature in the oven is related to the degree of shrinkage required, to the length of the oven, to the linear speed of the tube through the oven, and to the thickness of the film tube.

After heat treatment the tubular material leaves the chamber, is cooled and is then engaged by rotating slitter knives 15 which slit the tube while it is still in the open condition thereof to form two webs 16, 17, FIGURE 2, which are respectively drawn away from the chamber by co-operating rollers 18, 19 and 20, 21 and are moved thereby for winding on to reels 22, 23.

The rollers 18, 19 and 20, 21 also operate to draw the tube through the chamber and, to obtain particular described properties in the material, may be rotated at linear speeds approximating that of the input rollers IR, FIGURE 2, or NR, FIGURE 4, by which the flattened tube 1 is fed to the chamber 2.

By heat treating the material by the method and apparatus described with reference to the drawings it is found that the webs 16, 17 are each substantially flat and unwrinkled and have straight edges substantially free from waves and it is not necessary to remove waste material from the longitudinal marginal portions of the web.

I claim:

1. The method of removing sag, bagginess, and wrinkles from tubular biaxially oriented organic thermoplastic film, by subjecting the tubular film to a heat treatment while passing the tubular film lengthwise about hollow members disposed in spaced side-by-side relation to extend lengthwise of the tube, and maintaining a cushion of warm air between the tubular film and those portions of the hollow members opposed thereto to retain the tubular film in spaced relation with said members.

2. The method of removing sag, bagginess, and wrinkles from tubular biaxially oriented organic thermoplastic film, by passing the tubular film lengthwise about hollow members disposed in an oven in spaced side-by-side relation to extend lengthwise of the tube, maintaining a cushion of warm air between the tubular film and those portions of the hollow members opposed thereto to retain the tubular film in spaced relation with said members, and passing heated air through the oven while the tubular film is being moved through the oven.

3. The method of removing sag, bagginess, and wrinkles from tubular biaxially oriented organic thermoplastic film, by subjecting the tubular film to a heat treatment while passing the tubular film lengthwise about hollow members disposed in spaced side-by-side relation to extend lengthwise of the tube, and retaining the film in spaced relation with said members by maintaining between the tubular film and those portions of the hollow members opposed thereto a cushion of air the temperature of which is substantially equal to that of the temperature to which the film is subjected by said heat treatment.

4. The method of removing sag, bagginess, and wrinkles from tubular biaxially oriented organic thermoplastic film, by passing the tubular film lengthwise about hollow members disposed in an oven in spaced side-by-side relation to extend lengthwise of the tube, passing heated air through the oven while moving the tubular film therethrough, and maintaining between the tubular film and those portions of the hollow members opposed thereto a cushion of air the temperature of which is substantially equal to that of the temperature of said heated air passed through the oven.

5. Apparatus for removing sag, bagginess, and wrinkles from tubular biaxially oriented organic thermoplastic film, comprising hollow members connectable with a source of warm pressurised air and disposed in spaced side-by-side relation, means to move a biaxially oriented tubular film lengthwise about said hollow members, said members being apertured along the length thereof to permit warm air to issue from said members and form an air cushion between the members and those portions of the tubular film opposed thereto thereby to retain the tube in spaced relation with said members, and means to subject the tube to heat treatment while it is so spaced from said members.

6. Apparatus for removing sag, bagginess, and wrinkles from tubular biaxially oriented organic thermoplastic film, comprising a pair of pipes connectable with a source of warm pressurised air, disposed in spaced side-by-side relation, and each having an arcuate surface to face a portion of the interior of a tubular film, means to move a biaxially oriented tubular film lengthwise about said pipes, said pipes each having apertures formed in said arcuate surface thereof and disposed in two rows extending lengthwise of the pipe with the axes of the apertures of the respective rows located in planes forming an angle slightly less than 180 degrees with the centre of curvature of the arcuate surface and equispaced about a line bisecting the arcuate surface, said apertures permitting warm air to issue from the pipes and form an air cushion between the arcuate surfaces of the pipes and those portions of the tubular film opposed theerto thereby to retain the tube in spaced relation with said pipes, and means to subject the tube to heat treatment while it is so spaced from said members.

7. Apparatus according to claim 6, wherein said angle is about 160 degrees.

8. Apparatus according to claim 6, wherein each pipe is of circular cross-section.

9. Apparatus according to claim 6, including slitter means operable following cooling of the heat-treated tubular film to slit the tube longitudinally while it is still in the open condition thereof.

10. Apparatus for removing sag, bagginess, and wrinkles from tubular biaxially orinented organic thermoplastic film, comprising an oven open at the opposite ends thereof to permit the passage therethrough of a tubular film and having an inlet and an outlet to permit the passage of heated air through the oven to effect heat treatment of a tubular film passing through the oven, hollow members connectable with a source of warm pressurised air and disposed in spaced side-by-side relation in said oven to extend through said opposite ends of the oven, and means to move a biaxially oriented tubular film lengthwise through the oven and about said hollow members, said members being apertured along the length thereof to permit warm air to issue from said members and form an air cushion between the members and those portions of the tubular film opposed thereto thereby to retain the tube in spaced relation with said members.

11. Apparatus for removing sag, bagginess, and wringles from tubular biaxially oriented organic thermoplastic film, comprising an oven open at the opposite ends thereof to permit the passage therethrough of a tubular film and having an inlet and an outlet to permit the passage of heated air through the oven to effect heat treatment of a tubular film passing through the oven, a pair of pipes connectable with a source of warm pressurised air, disposed in the oven in side-by-side relation to extend through said opposite ends of the oven, and each having an arcuate surface to face a portion of the interior of a tubular film, and means to move a biaxially oriented tubular film lengthwise through the oven and about said pipes, said pipes each having apertures formed in said arcuate surface thereof and disposed in two rows extending lengthwise of the pipe with the axes of the apertures of the respective rows located in planes forming an angle slightly less than 180 degrees with the centre of curvature of the arcuate surface and equispaced about a line bisecting the arcuate surface, said apertures permitting warm air to issue from the pipes and form an air cushion between the arcuate surfaces of the pipes and those portions of the tubular film opposed thereto thereby to retain the tube in spaced relation with said pipes.

12. Apparatus according to claim 11, wherein said angle is about 160 degrees.

13. Apparatus according to claim 11, wherein each pipe is of circular cross-section.

14. Apparatus according to claim 11, including slitter means operable following cooling of the heat-treated tubular film to slit the tube longitudinally while it is still in the open condition thereof.

15. Apparatus according to claim 11, wherein each pipe is of circular cross-section and said angle is about 160 degrees.

16. Apparatus according to claim 15, including slitter means operable following cooling of the heat-treated tubular film to slit the tube longitudinally while it is still in the open condition thereof.

References Cited by the Examiner
UNITED STATES PATENTS

| | | |
|---|---|---|
| 2,433,932 | 1/1948 | Thornberg. |
| 3,002,222 | 10/1961 | Sevison _____ 18—1 |
| 3,119,147 | 1/1964 | Krackt _____ 18—1 |
| 3,124,429 | 3/1964 | Alexeff et al. _____ 18—1 X |

WILLIAM J. STEPHENSON, *Primary Examiner.*